United States Patent

Maw

[11] Patent Number: 5,579,602
[45] Date of Patent: Dec. 3, 1996

[54] ANIMAL TRAP

[76] Inventor: David S. Maw, P.O. Box 113, Tappen, N. Dak. 58487

[21] Appl. No.: 420,286
[22] Filed: Apr. 10, 1995
[51] Int. Cl.$^6$ .................................................. A01M 23/26
[52] U.S. Cl. ........................................ 43/90; 43/88; 43/92
[58] Field of Search ................................... 43/88, 92, 93, 43/90, 94

[56] References Cited

U.S. PATENT DOCUMENTS

| | | | |
|---|---|---|---|
| 1,481,740 | 1/1924 | Ray | 43/88 |
| 1,527,034 | 2/1925 | Durrin | 43/92 |
| 2,311,920 | 2/1943 | Adams | 43/88 |
| 4,817,313 | 4/1989 | Falzon et al. | 43/88 |

Primary Examiner—J. Elpel

[57] ABSTRACT

An animal trap which is capable of operating in a confined space such as that of a hole. The trap comprises of a pair of jaws which are urged to a closed position and prevented from being opened once closed by a compression spring. A trigger mechanism is used to latchably maintain the said jaws in a open position and provides a animal with a means to disengage the said latch. The said jaws are pivotally mounted to and between two side frames which are secured to a circular base frame.

2 Claims, 3 Drawing Sheets

ANIMAL TRAP

This invention is a new and useful an animal trap. It can be used as a foot trap for larger animals such as fox, coyotes, badgers or any animal that ill attempt to dig a attraction from a rodent sized hole in the ground.

This invention can also be used as a body trap for smaller animals such as gophers, rats, ermine or similar sized animals that will enter or exit a borrow or small hole in the ground.

The trigger style is the main determing factor of how the trap is used.

BACKGROUND ART

In the prior art of trapping their are many sizes and designs of traps that are used to capture an animal by the foot. The majority of these traps are not able to operate in a constricted space such as that of a hole. They also operate in a manner in which the animal to be trapped must step on the trap before the trigger mechanism is released allowing the jaws to close. A disadvantage of these traps is the difficulty of predicting where an animal is going to step and getting the animal to properly step on the trap. These traps inherent another disadvantage of having non-target animals interfere and getting caught in the trap.

Typical trap designs that are able to operate in a constricted space of a hole are limited to capturing rodent sized animals. The majority do not positively prevent the jaws from opening once closed on an animal. Therefore they rely on the force of the spring to squeeze an animal which prevents the animal from escaping. Many are unable to take advantage of the strength of a jaw which is mounted at both ends, compared to that of a jaw that is mounted at one end. Others do not allow an animal to pass through the trap and use impaling devices that would result in undesirable pelt damage to smaller furbearing animals.

SUMMARY OF INVENTION

The present invention is an animal trap, which has pivotally mounted jaws that are held in an open position by a trigger. The trigger will release the jaws to a closed position if moved one or more directions. The jaws are urged to a closed position by a compression spring. The jaws are pivotally mounted to and between two side frames. One of the said side frames supporting the compression spring. A circular base secures the said side frames and provides a opening which allows the foot, body or vision to pass through the trap when the jaws are in an open position.

The object of this invention is to provide an animal trap that will operate in a space no larger then that required to house the trap in the set position and having jaws that are positively prevented from being opened prior to complete closure of said jaws.

It is a object of this invention to provide an animal trap that allows an animal to visually see the attraction used to lure the animal into the trap. The trap provided with a pull trigger will also allow an animal, such as a fox or coyote to place its nose in the trap without releasing the trigger mechanism.

Another object of this invention is to provide a trap that is able to avoid certain animals by using their physical limitations and natural lack of interest in retrieving a attraction from a hole, which is used to house the trap. A useful example of this object is that it may permit a trapper to trap fox or coyotes while avoiding sheep and goats.

It is another object of this invention to provide a trap that will swiftly kill rodents, such as gophers and rats, and similar sized animals.

DETAILED DESCRIPTION

Figure 1:
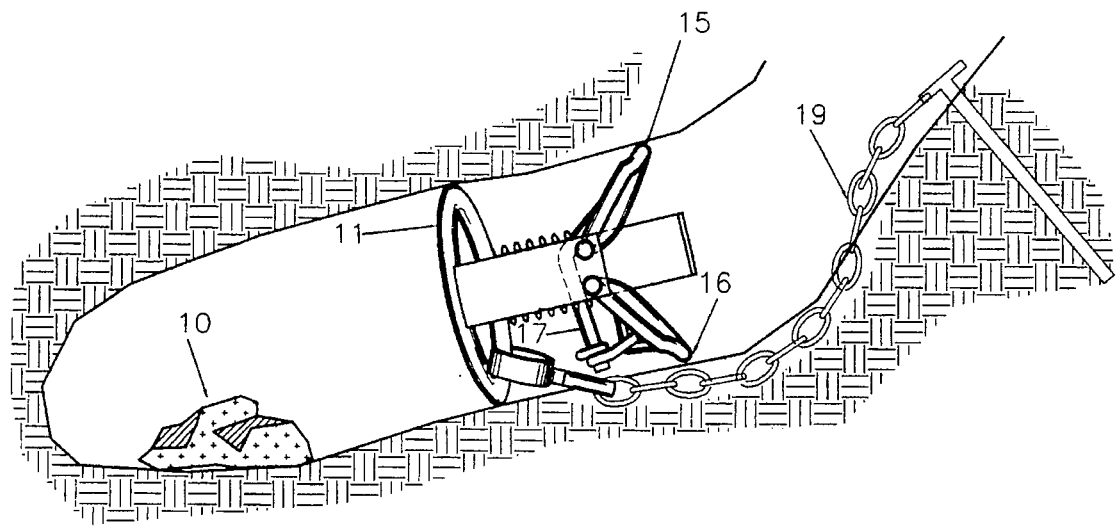
FIG. 1 is a sectional side view of trap in its preferred embodiment in set position.
Figure 2:
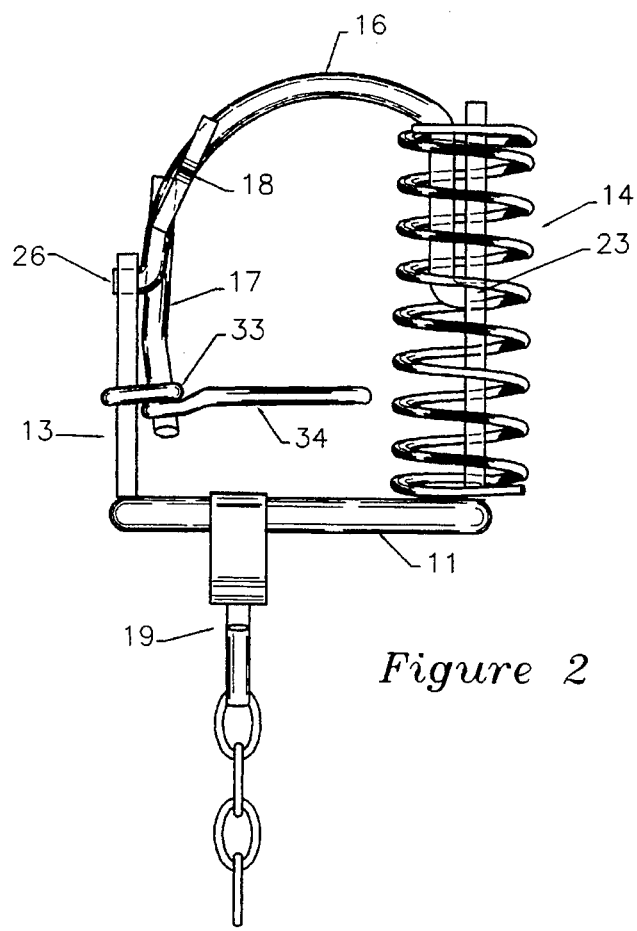
FIG. 2 is a side view of trap in the closed position.

Referring specifically to the drawings of the present invention. A metalic rod or shafting is bent to form a circle or ring which is used as a base frame 11. Side frames 12, 13 are that of flat iron. The said side frames 12, 13 are secured parallel to each other on opposing sides of the said base frame 11. One of the said side frames 12 is extended. This extension supports a surrounding compression spring 14 and prevents side movement of the jaws when they are in a closed position by the said spring 14.

Two holes 25, 26 are drilled or punched near the top of the springless side frame 13. Two holes 23, 24 are made in the said extended spring side frame 12. The holes 25, 26, 23, 24 are all equal in distance from the base frame 11. Therefore the holes 23, 24 in the extended spring side frame 12 are in alinement with the corresponding holes 25, 26 in the non spring side frame 13.

The jaws 15, 16 are primarily made by bending a length of metalic rod or shafting and are described in a closed position. The jaws 15, 16 are of semi-circular design from the points 25, 26 where they are pivotally mounted to the non spring side frame 12 to the points 35, 36 in which they are near the top of the said extended spring side frame 13. At these points 35, 36 they are bent in a outward and downward direction.

The outward bend 35, 36 is made to allow the use of a spring 14 which has a greater inside diameter than that of the combined jaws 15, 16. Therefore this bend allows the spring to completely close the jaws 15, 16.

The downward bend 35, 36 is made in such a manner that the jaws 15, 16 are allowed to closely extend along the inside of the said extended spring frame 12 to the points 23, 24 where they are bent to be pivotally mounted. This provides a means of the surrounding spring 14 to move the jaws 15, 16 from an open position to a closed position smoothly and quickly.

The ends of each jaw 15, 16 are bent in a manner in which they are straight outward directions. The jaws ends are placed in the said corresponding frame holes 24, 25 and 23, 26 and are allowed to freely pivot to and from open and closed positions.

One of said jaws 15 has a trigger support 17. The said trigger support 17 is made from a single length of metalic rod or shafting. The said trigger support 17 is secured to the outside of a jaw 15 near the non spring side frame 13. A obtuse bend is made to allow the said trigger support 17 to be positioned under the detent support on the opposing jaw, when the jaws are in a open position.

A latch or detent support 18 is secured to the outside of the opposing jaw 16 in which the said -trigger support 17 is secured. The detent support 18 is made from a length of heavy gage metalic wire with an approximate right angle bend in the middle of said length of wire. When the said jaws 15, 16 are in open position the said detent support 18 is positioned above that of the said trigger support 17 and allows the detent of a trigger to latchably engage and disengage.

A multicoiled compression spring 14 encircles the spring side frame 12. The lower end of said spring 14 bearing against the base frame 11. The upper end of said spring bearing against the said jaws 15, 16 and said side frame 12. When the spring 14 is compressed and the jaw 15, 16 are in open position, the force of the said spring 14 wanting to return to its free length urges the jaws to a closed position.

Once the spring 14 has reached a certain height on the jaws 15, 16 the force of the spring 14 and friction will not allow the said jaws 15, 16 to compress the spring by means of forcing the jaws to open position. The temper and strength of the spring 14 is one of the determing factors which allows prevention to take place.

Figure 4:
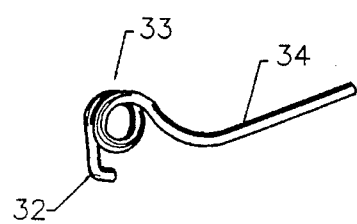
FIG. 4 is a general view of a pull type trigger.
Figure 5:
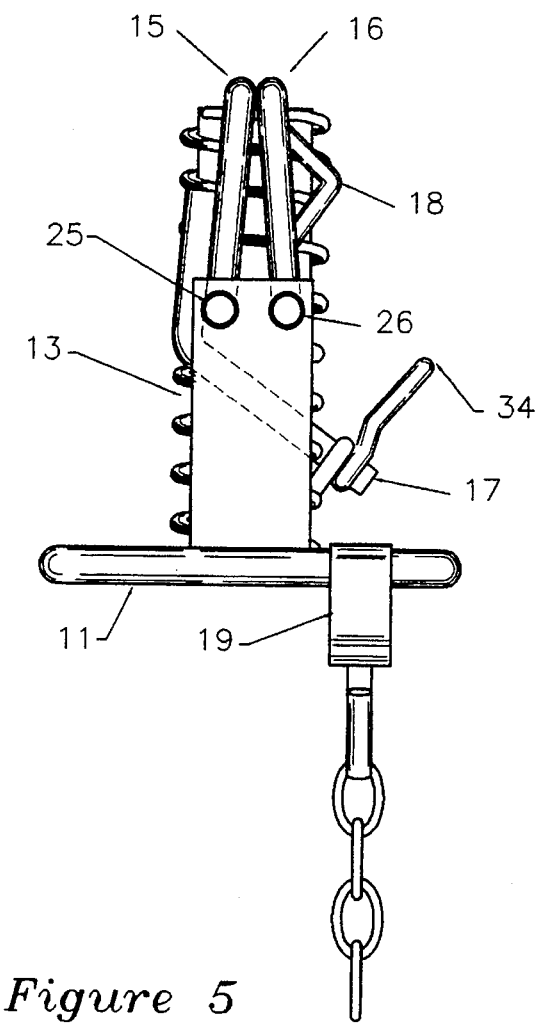
FIG. 5 is a view of the non-spring side of trap in a closed position.
Figure 6:
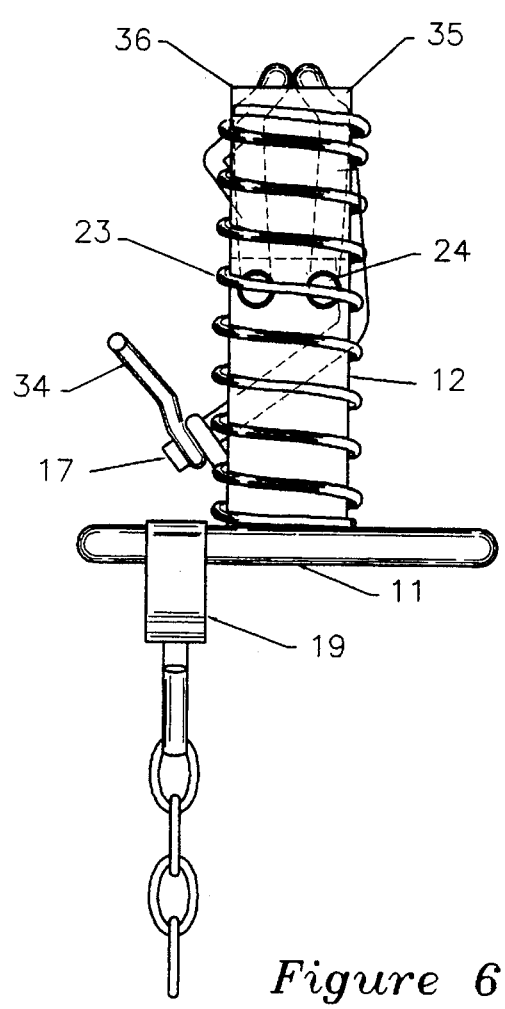
FIG. 6 is a view of the spring side of trap in a closed position.
Figure 7:
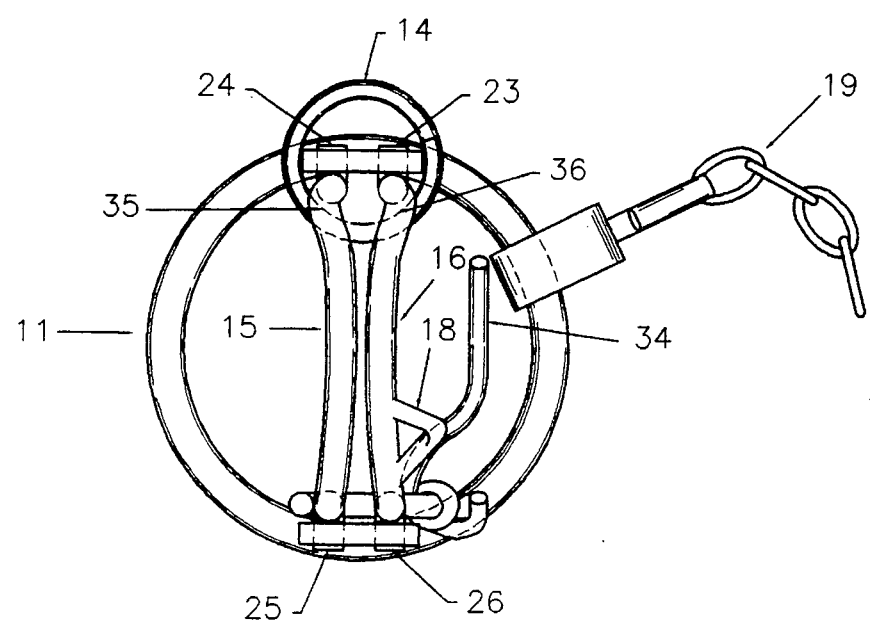
FIG. 7 is a top view of trap in a almost completely closed position.
Figure 8:
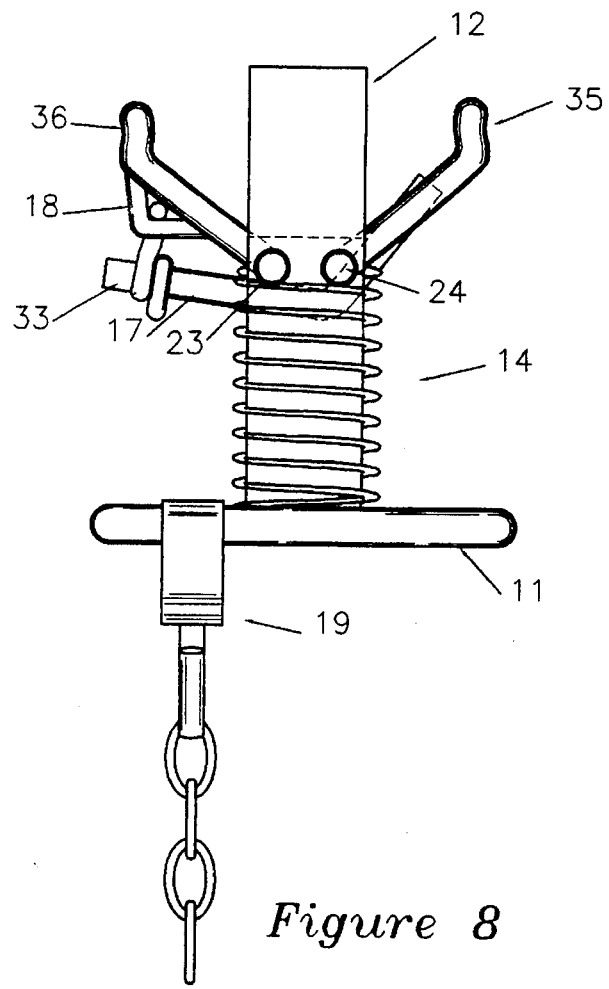
FIG. 8 is a view of the spring side of trap in a open position.
Figure 9:
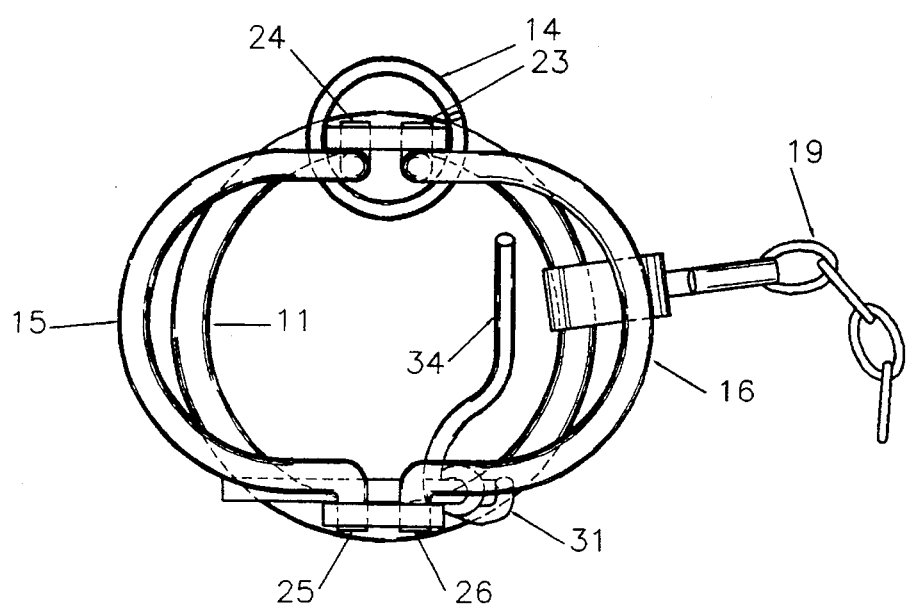
FIG. 9 is a top view of trap in a open position.

A pull type trigger FIG. 4 is formed from a single length of heavy gage metalic wire. A bend 32 is made near the end of said wire, to provide a latch or detent. A loop 33 is than made to form a eye which provides a means of pivotally mounting the said trigger FIG. 4 to the said trigger support 17. With the said trigger FIG. 4 pivotally mounted to said trigger support and said detent engaged in said detent support 18, the trigger is than latchably fastening the jaws together in a open position. In the described position, the extending member 34 extends towards the opposing side of jaw 16 and is terminated. The said extending member 34 provides an animal with a means of disengaging the detent when pulled forward.

Figure 3:
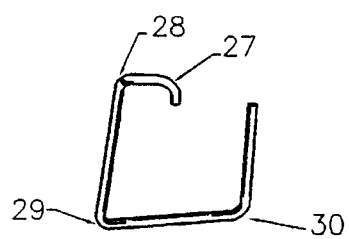
FIG. 3 is a general view of a push or pull type trigger.

A trigger FIG. 3 which is capable of releasing the jaws 15, 16 when moved forward or rearward, is made from a single length of heavy gage metalic wire. A bend 27 is made near the end of the said wire and provides a latch or detent. At a distance from the detent bend 27 another bend 28 is made in a manner so the extending members from the bends 27, 28 are extending approximately the same direction. The distance between the bends 27, 28 is such that it allows the extending member from bend 28 to be placed under the said trigger support 17 and said detent to be engaged in said detent support 18 and the said trigger FIG. 3 is able to latchably fasten the jaws together in a open position. With trigger FIG. 3 and jaws 15, 16 in the described set position, the extending member from bend 28 extends towards the opposing side of the jaw 16 and is bent upwards 29. The extending member extends upwards from the upward bend 29 and is than bent 30 so the extending member from the bend 30 is extending back towards the non-spring side frame and is terminated.

The extending members from bend 28 provide contact area which ensures movement of the trigger FIG. 3 when an animal attempts to pass through the trap. When the said trigger FIG. 3 is pushed rearward by an animal the said extending member under the trigger support 17 is allowed to slide. Therefore the angle is changed friction receded and stored energy of the said spring is allowed to close the jaw 15, 16 onto the animal. The jaws are allowed to completely close before the upward bend 30 of the trigger reaches the trigger support 17. Therefore the detent does not have to disengage from the detent support 18 to allow the jaws to completely close.

With the trigger FIG. 3 and jaws 15, 16 in the described set position, the detent will disengage from the detent support of the said extending trigger members are pulled forward by an animal.

Number 19 is used to show a method of anchoring the trap. This anchoring prevents an animal from running off with the trap once caught, this anchoring method and many more are known in the prior art.

The preferred placement of this invention is that of a hole. Whether a naturally exiting hole or a man made hole is used, it is preferred that the hole diameter be just large enough for the trap, in the set position, to be inserted inside the hole. A small trench can be made in the bottom of the hole for the chain to lay in. The chain and bottom jaw 16 can be lightly covered with dirt to help conceal the trap. A attraction 10 may be placed on or behind the trigger to help lure a animal into the trap. If the trap is placed in a burrow or tunnel that a animal is using as a doorway a attraction is not necessary and the trap is placed in the hole facing the direction the animal is coming from.

This invention is of simple and durable construction. Being all parts are of metal, welding is suitable for securing the parts together.

While I have described my invention in a preferred design, it is to be understood that various changes may be made without departing from the spirit and scope of this invention. I intend to cover these variation in my claims.

What I claim is:

1. An animal trap comprising;
   a. a base frame,
   b. two side frames extending perpendicularly from said base frame, said side frames opposing each other,
   c. a compression spring encircling one of said side frames,
   d. a first jaw having opposing ends pivotally attached to said side frames, said first jaw having a trigger support rod extending therefrom,
   e. a second jaw having opposing ends pivotally attached to said side frames, said second jaw having a detent support,
   f. a trigger rod having a bend, a detent, and an extending member opposite said detent; and
   wherein when said trap is set said first jaw trigger support rod extends toward said second jaw, and said trigger rod bend engages said support rod and said detent engages the second jaw detent support to hold said first and second jaws in a spaced apart open position thereby compressing said compression spring, and said extending member extends between said side frames; and
   wherein when said trigger rod is tripped said jaws forcefully close under the force of said compression spring.
2. The animal trap of claim 1 wherein the base frame is circular ring shaped for supporting the trap in a ground hole.

* * * * *